Sept. 18, 1945.                  W. W. GARSTANG                  2,384,829
                              VOLTAGE CHANGING CIRCUIT
                                  Filed April 12, 1943
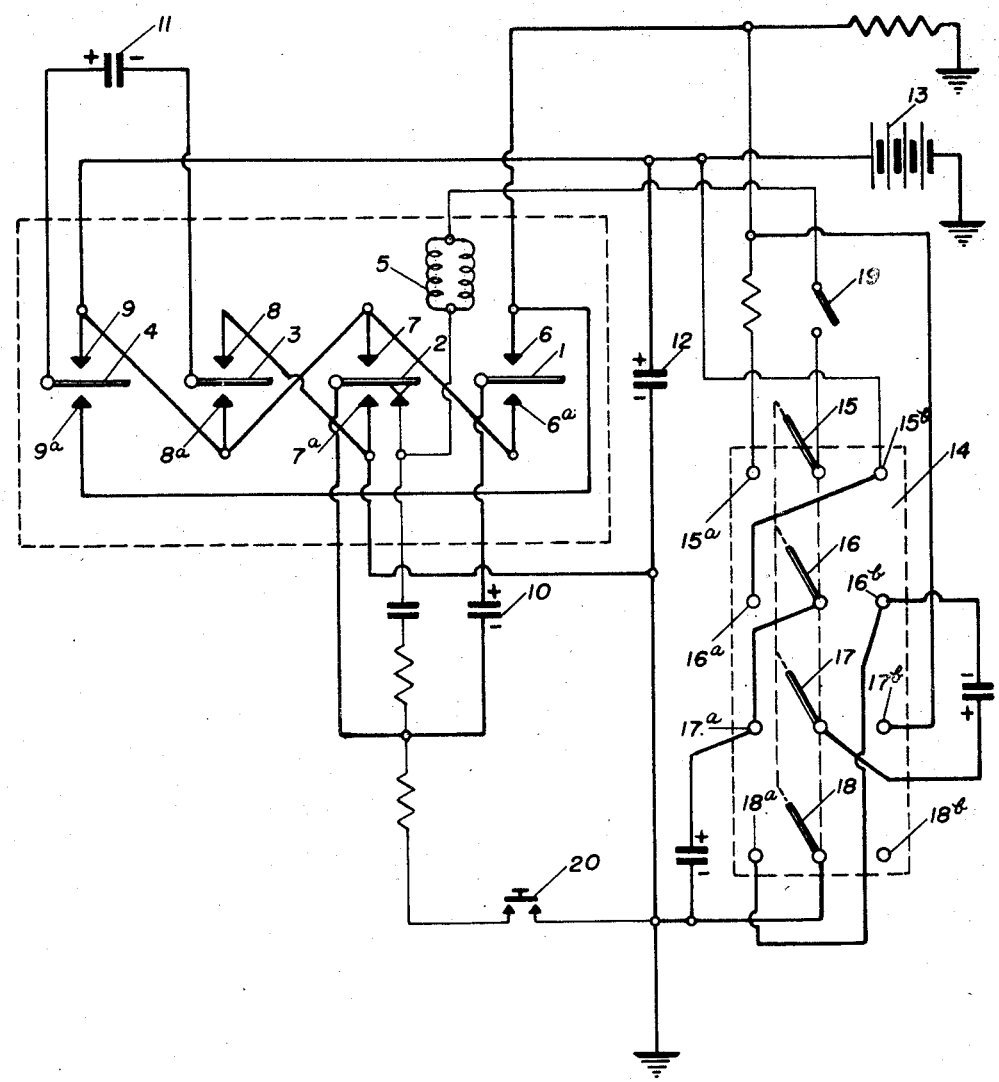
INVENTOR.
William W. Garstang
BY:
W. P. Hahn
ATTORNEY Patented Sept. 18, 1945

2,384,829

UNITED STATES PATENT OFFICE 2,384,829

VOLTAGE CHANGING CIRCUIT

William W. Garstang, Indianapolis, Ind., assignor to Electronic Laboratories, Incorporated, Indianapolis, Ind., a corporation of Indiana Application April 12, 1943, Serial No. 482,735

10 Claims. (Cl. 171—97)

The present invention relates to voltage modifying systems.

It has for one of its objects that of providing a system capable of modifying the voltage to enable a higher voltage to be delivered to the load than that delivered by the source of power or by the manipulation of control means dividing the voltage to deliver to the load a lower voltage than that delivered by the source of power.

A further object of my invention is to provide a voltage modifying system in which a minimum of condensers or capacitors may be used to accomplish the desired results; and a still further object of my invention is to provide a voltage modifying system capable of delivering a full wave output and one in which there is provided a common ground or common negative lead.

For the purpose of describing my invention, I have illustrated an embodiment thereof in the accompanying drawing, in which:

The figure is a diagrammatic view of a circuit embodying my invention.

In the embodiment of the invention illustrated, I preferably provide a vibrator having four vibrating contact members or reeds 1, 2, 3 and 4, vibrated by a pair of suitable electromagnets having windings 5. Each of the reeds 1, 2, 3 and 4 respectively vibrates between a pair of contacts 6, 6a, 7, 7a, 8, 8a, 9 and 9a. A condenser 10 is connected between the reeds 1 and 2 and a second condenser or capacitor 11 is connected between the reeds 3 and 4. A third condenser 12 is connected between the low voltage source of power which may be in the form of a battery 13 and the ground or the negative lead, the opposite terminal of the battery being grounded or connected to the negative lead. Contacts 6a and 8a are connected to the input side of the battery 13 and contact 9 is connected to the output side of the load. One side of the load is grounded or connected to the common negative lead. Contacts 7 and 9 are connected to the input side of the circuit including battery 13. Contact 6 is connected to the output side of the circuit including the load.

Switching mechanism 14 is provided for reversing the operation of the circuit to cause it to change from multiplying to dividing or vice versa, and this mechanism includes switch arms 15, 16, 17 and 18 interconnected to cause them to move in unison. Arm 15 engages contact 15a or 15b. Arm 16 engages contacts 16a or 16b. Arm 17 engages contact 17a or 17b, and arm 18 engages contact 18a or 18b.

With the switches 15 to 18 closed respectively on contacts 15b to 18b respectively and switch 19 closed, upon closing switch 20, the circuit of windings 5 will be closed, thus operating the reeds 1 to 4, moving the reeds to engage respectively contacts 6, 7, 8 and 9. This connects condenser 11 with the battery 13, the circuit being completed through ground or common negative. At the same time, condenser 10, which we will assume has been previously charged, is connected in series with the battery and output or load, this circuit including the ground or common negative, so that the voltage of the battery is doubled, say from 12 volts to a 24 volt discharge to the load. As the reed 2 swings to engaging position with contact 7, it breaks the circuit of the windings 5 permitting this reed and its companions to swing back under their own momentum to engage the contacts 6a to 9a, thus connecting the condenser 10 with the source of supply and the condenser 11 in series with the battery and output side of the circuit or load, again delivering a double voltage to the load. I am thus enabled, with three condensers, to provide a full wave doubling circuit having a common negative lead or ground.

With switch 15 and accompanying switch 16 to 18 thrown in the opposite direction and 15 engaging contact 15a, the "output" side will become the input side, and if a 24 volt supply is delivered, 12 volts will be applied to the "input" side which now becomes the output. In each instance, however, it is to be observed that I have provided a full wave arrangement in which there is provided a common negative or common lead.

I claim as my invention:

1. A voltage modifying system including two pairs of vibrating contact members, a storage capacitor connected between each pair, a pair of contacts associated with each vibrating contact member, a pair of leads adapted for connection, one to the load and the other to a source of supply, one of said leads being connected to one of the contacts associated with one of said vibrating contacts of the first pair and to an opposite contact associated with one of the second pair of vibrating contacts, the opposing contacts of each of said two vibrating contacts being connected to the second lead, contacts associated with each of the other two vibrating contacts being connected to a common negative lead, the other contacts of each of said second two vibrating contacts being connected to the second lead.

2. A voltage modifying system including two pairs of vibrating contact members, a storage capacitor connected between each pair, a pair of contacts associated with each vibrating contact member, a pair of leads adapted for connection, one to the load and the second to a source of supply, one of said leads being connected to one of the contacts associated with one of said vibrating contacts of the first pair and to an opposite contact associated with one of the second pair of vibrating contacts, the opposing contacts of each of said two vibrating contacts being connected to the second lead, opposing contacts of each of the other vibrating contacts being connected to a common negative lead, the other contacts of each of said last mentioned vibrating contacts of the pairs being connected to the second lead, a driving magnet for said vibrating contacts and a switch for connecting the windings of said magnet with one of said first two mentioned leads.

3. In combination, two pairs of vibrating contacts, each of said vibrating contacts having a pair of contacts associated therewith, a pair of positive leads and a common negative lead, a storage capacitor connected between the vibrating contacts of each pair, means through said vibrating contacts and their associated contacts for alternately connecting one of the storage capacitors between a pair of vibratory contacts with the common negative lead and simultaneously connecting the other of said storage capacitors between the pair of vibrating contacts between the other of said positive leads and the common negative lead.

4. In combination, a pair of positive leads and a common negative lead, a pair of storage capacitors, a vibrating interrupter including vibrating and stationary contact members and an electromagnet for driving said vibrating members, having its circuit controlled by said vibrating members for alternately connecting one of said pair of capacitors between one of said positive leads and said common negative lead and simultaneously connecting the other of said capacitors between the other positive lead and said common negative lead.

5. A voltage modifying circuit including a pair of positive leads and a common negative lead, a pair of storage capacitors, and means for alternately connecting one of said pair of said storage capacitors between a first positive lead and the common negative lead and the second of said pair of storage capacitors and said second mentioned capacitor in series with the other of said positive leads and the common negative lead and for connecting said second of the pair of storage capacitors between said first of the positive leads and the common negative lead and the first of said pair of storage capacitors between the other of said positive leads and said common negative.

6. A voltage modifying system including two pairs of vibrating contact members, an electrical energy-storage unit connected between each pair, a pair of contacts associated with each vibrating contact member, a pair of leads adapted for connection, one to the load and the other to a source of supply, one of said leads being connected to one of the contacts associated with one of said vibrating contacts of the first pair and to an opposite contact associated with one of the second pair of vibrating contacts, the opposing contacts of each of said two vibrating contacts being connected to the second lead and contacts associated with each of the other two vibrating contacts being connected to a common negative lead, the other contacts of each of said second two vibrating contacts being connected to the second lead.

7. A voltage modifying system including two pairs of vibrating contact members, an electrical energy-storage unit connected between each pair, a pair of contacts associated with each vibrating contact member, a pair of leads adapted for connection, one to the load and the second to a source of supply, one of said leads being connected to one of the contacts associated with one of said vibrating contacts of the first pair and to an opposite contact associated with one of the second pair of vibrating contacts, the opposing contacts of each of said two vibrating contacts being connected to the second lead, opposing contacts of each of the other vibrating contacts being connected to a common negative lead, the other contacts of each of said last-mentioned vibrating contacts of the pairs being connected to the second lead, a driving magnet for said vibrating contacts and a switch for connecting the windings of said magnet with one of said first two mentioned leads.

8. In combination, two pairs of vibrating contacts, each of said vibrating contacts having a pair of contacts associated therewith, a pair of positive leads and a common negative lead, an electrical energy-storage unit connected between the vibrating contacts of each pair, means through said vibrating contacts and their associated contact for alternately connecting one of the storage units between a pair of vibratory contacts with the common negative lead and simultaneously connecting the other of said storage units between the pair of vibrating contacts between the other of said positive leads and the common negative lead.

9. In combination, a pair of positive leads and a common negative lead, a pair of electrical storage units, a vibrating interrupter including vibrating and stationary contact members and an electromagnet for driving said vibrating contact members, having its circuit controlled by said vibrating contact members for alternately connecting one of said pair of units between one of said positive leads and said common negative lead and simultaneously connecting the other of said units between the other positive lead and said common negative lead.

10. A voltage modifying circuit including a pair of positive leads and a common negative lead, a pair of electrical storage units, and means for alternately connecting one of said pair of said storage units between a first positive lead and the common negative lead and the second of said pair of storage units with the other of said positive leads and the common negative lead and for connecting said second of the pair of storage units between said first of the positive leads and the common negative lead and the first of said pair of storage units between the other of said positive leads and said common negative lead.

WILLIAM W. GARSTANG.